Patented Apr. 5, 1938

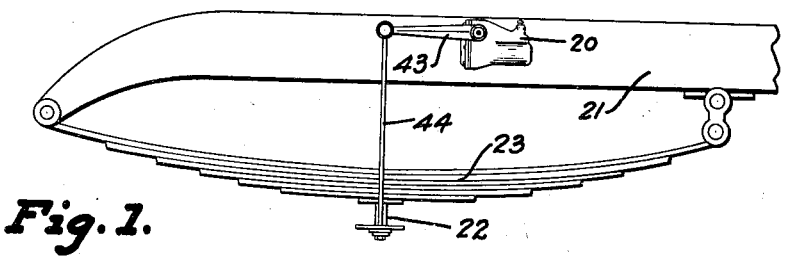
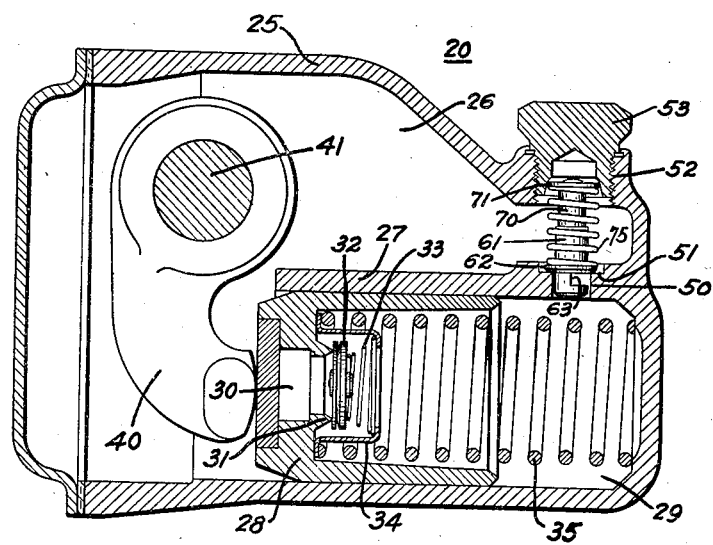
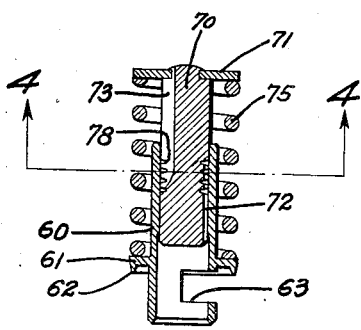
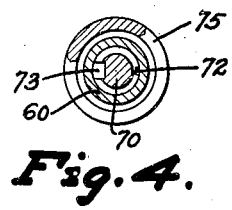

2,113,013

UNITED STATES PATENT OFFICE 2,113,013

SHOCK ABSORBER VALVE

Ralph I. Bates, Dayton, Ohio, assignor to General Motors Corporation, Detroit, Mich., a corporation of Delaware Application March 4, 1936, Serial No. 67,046

5 Claims. (Cl. 137—111)

This invention relates to improvements in fluid flow control devices particularly adapted for use in hydraulic shock absorbers.

Whistling and hissing noises usually produced by improperly designed fluid flow control devices of the hydraulic shock absorber prove extremely annoying, especially in the present-day motor vehicle in which objectionable noises have been practically eliminated.

It is among the objects of the present invention to provide a fluid flow control device for a hydraulic shock absorber of simple structure and design, capable of restricting fluid flow under comparatively high pressure without producing any substantial or objectionable noises.

Further objects and advantages of the present invention will be apparent from the following description, reference being had to the accompanying drawing wherein a preferred embodiment of the present invention is clearly shown.

In the drawing:

Fig. 1 is a fragmentary side view of a vehicle chassis, a shock absorber equipped with the present invention being shown applied thereto. The roadwheel of the vehicle has been eliminated for the sake of clearness;

Fig. 2 is a longitudinal sectional view taken through the center of the shock absorber;

Fig. 3 is an enlarged sectional view of the fluid flow control device removed from the shock absorber, and Fig. 4 is a transverse sectional view taken along the line 4—4 of Fig. 3.

Referring to the drawing, the shock absorber designated as a whole by the numeral 20 is shown attached in any suitable manner to the frame 21 of the vehicle. This frame 21 is supported upon the axle 22 by the vehicle spring 23.

The shock absorber comprises a casing 25 providing a fluid reservoir 26 and a cylinder 27. Within this cylinder a piston 28 is provided, forming a fluid displacement chamber 29 within the cylinder. A passage 30 in the piston provides for the transfer of fluid from one side of the piston to the other. On the inner surface of the piston head and surrounding passage 30 there is provided an annular ridge 31 forming a valve-seat for the intake valve 32 which is urged normally to engage the annular seat 31 by a spring 33. One end of this spring engages valve 32; the other is supported by a cage member 34 maintained in engagement with the inner surface of the piston head by a spring 35 interposed between the piston and the closed end of the displacement chamber 29. This spring maintains the head of the piston 28 in engagement with the free end of the operating cam 40 of the shock absorber, said cam being attached to the rocker shaft 41 transversely journaled in the shock absorber housing. One end of this shaft extends to the exterior of the housing or casing and has the shock absorber operating arm 43 secured thereto, the free end of which is secured to the one end of the link 44, the opposite end of said link being secured in any suitable manner to the axle 22.

The displacement chamber 29 is in communication with the reservoir 26 through a port 50 which is counter-bored to form a shoulder 51 facing the reservoir 26. An interiorly threaded opening 52 in the casing is directly opposite and in coaxial alignment with the port 50, this opening 52 receiving the valve plug 53 and closing the opening 52.

The flow of fluid from displacement chamber 29 through port 50 into the reservoir 26 in response to movement of the piston toward the right, as regards Fig. 2, is regulated by the fluid flow control device which includes a tubular member 60 having an outwardly extending annular flange 61 provided with an annular ridge 62 adjacent its peripheral surface. This flange is spaced from the end of the tubular member extending into and slidably supported within the port 50, as shown in Fig. 2. The end of tubular member 60 extending into the port 50 has an opening 63 in its side wall which, when the annular ridge 62 engages the shoulder 51, lies within the confines of port 50 and cannot pass fluid therethrough.

The fluid flow control device comprises also a stationary valve-stem 70, one end of which slidably fits into the tubular member 60 so as to support the same, the other end having an abutment disc 71 secured thereto in any suitable manner. This valve-stem 70 has two longitudinal grooves, one designated by the numeral 72 of a predetermined fluid flow capacity, the other designated by the numeral 73 of a predetermined greater fluid flow capacity. Longitudinal groove 72 starts from the end of the stem 70 extending into the tubular member 60 and terminates short of the outer end of said stem at which the abutment disc is secured. The other larger capacity groove 73 starts at the end of the stem 70 having the abutment disc 71 secured thereto and terminates short of the end of the stem extending into the tubular member 60. Groove 72, when the control device is in normal position as shown in Fig. 2, does not extend to the exterior of the tubular member 60, but is always within the confines of the tubular member, and groove 73 under the same circumstances, extends from the exterior into the interior of said tubular member. A spring 75 is interposed between the flange 61 of the tubular member 60 and abutment disc 71, this spring yieldably urging the annular ridge 62 of the flange 61 into engagement with the shoulder 51 to prevent a fluid flow from the side opening 63 of the tubular member past the flange 61 and at the same time urging the abutment disc 71 into engagement with a recess portion of the screw plug 52.

The Fig. 3 shows the fluid flow control device extended, as when removed from the shock absorber. When assembled in the shock absorber, grooves 72 and 78 are always within the confines of tubular member 60.

The valve stem 70 has a plurality of annular grooves 78 which provide communication between the longitudinal grooves 72 and 73 and only within the confines of tubular member 60. These grooves are shown in the drawing as plain circular grooves, but they may be helical, in the form of a screw-thread, suffice that they provide communication between the longitudinal grooves.

The device functions in the following manner:

In response to the striking of an obstruction by the roadwheel of the vehicle, axle 22 is thrust upwardly toward the frame 21, compressing the spring 23. In response to this upward thrust of the axle 22, the link 44 connected thereto and to the arm 23 will actuate said arm clockwise, causing a clockwise rotation of the cam 40. The spring 35 urges the piston 28 to follow this clockwise rotation of the cam 40 and thus causes fluid from the reservoir 26 to act through the piston 30 in the head against valve 32, moving it from its seat and thus providing for a substantially unrestricted flow of fluid from the reservoir 26 into the displacement chamber 29.

The vehicle spring 23 having reached the limit of its compression in response to the striking of this certain obstruction, will rebound to its normal load position, resulting in a movement of arm 43 and cam 40 counterclockwise, the cam 40 thus pushing the piston 28 into the cylinder, causing it to exert a pressure upon the fluid within the displacement chamber 29. Fluid will now be urged from the chamber 29, the initial flow passing through the small capacity longitudinal groove 72 of the valve stem 70, thence through the annular grooves 78 connecting it with the other longitudinal groove 73 and then into the reservoir. The restriction to the flow of fluid by the groove 72 causes the shock absorber to offer resistance to this rebound movement of the vehicle spring 23.

It has been found by experiment that where a fluid is forced under high pressure through a small orifice, usually a whistling and hissing noise will result. Applicant has, therefore, provided annular grooves 78 in communication with grooves 72, said annular grooves 78 acting as fluid expansion chambers constantly lying within the confines of the tubular member 60. As the fluid flows from groove 72 through the annular grooves 78, the opposite flows through grooves 78 will impinge, setting up a turbulence which has a muffling effect. These grooves 78, lying within the confines of tubular member 60 thus provide expansion chambers for the fluid pressure, which chambers, being within the confines of said tubular member, entirely dampen or muffle any noises that might be set up by the fluid flow through the small capacity groove 72, thus rendering the control device substantially noiseless. From the annular grooves 78 the fluid enters the larger capacity groove or passage 73 providing another muffling means which would tend further to reduce noises. However, fluid flow noises are substantially eliminated before the fluid enters into and is ejected from the groove 73.

If, in response to the striking of an unusually large bump the spring 23 is compressed to an extreme position and consequently rebounds so as to create an excessive pressure within the displacement chamber 29, which pressure cannot properly be relieved by the capacity of the fluid groove 72, then the tubular member 60 is moved by fluid pressure so that flange 61 is disengaged from the shoulder 51, thereby permitting fluid to flow through the side opening 63 and around the flange 61 of said tubular member.

From the aforegoing it may be seen that applicant has provided a simple fluid flow control device adapted in an efficient manner to reduce noises usually caused by improperly designed fluid flow control devices, especially where such devices are used to control fluid flow at comparatively high pressures.

While the embodiment of the present invention as herein disclosed, constitutes a preferred form, it is to be understood that other forms might be adopted, all coming within the scope of the claims which follow.

What is claimed is as follows:

1. A fluid flow control device for the outlet port of a fluid displacement chamber, comprising in combination, a tubular member having a flange adapted to engage the wall of the displacement chamber surrounding the port; a stationary member providing a stem upon which the tubular member is slidably carried, said stationary member having two grooves, one comparatively narrow and terminating short of one end of said member, the other substantially wider and terminating short of the other end of said member, and annular grooves connecting the wide and narrow grooves; and a spring urging the tubular member toward the port.

2. A fluid flow control device for the outlet port of a fluid displacement chamber comprising, in combination, a tubular member having an outwardly extending, annular flange adapted to engage the wall of the displacement chamber surrounding the port; a stationary stem slidably supporting said tubular member, said stem having a groove extending from the end of the stem within the tubular member and terminating short of the end of the stem outside said tubular member, and another groove extending from the end of the stem outside said tubular member and terminating short of the end of said member inside the tubular member; annular grooves providing the sole connection between the two aforementioned grooves; and a spring urging the tubular member toward the port.

3. A fluid flow control device for the outlet port of a fluid displacement chamber comprising, in combination, a tubular member having a flange adapted to restrict fluid flow from the port; a stationary stem slidably supporting said tubular member and having two diametrically opposed longitudinal grooves of different fluid flow capacity, the one of smaller capacity beginning at the inner end of said stem and extending outside the tubular member, the larger capacity groove extending from the outer end of the stem and terminating short of the inner end; spaced annular grooves providing communication between said longitudinal grooves; and a spring interposed between the stem and tubular member and urging the latter toward the port.

4. A fluid flow control device for the outlet port of a fluid displacement chamber, comprising, in combination, a tubular member adapted to permit fluid from the port to flow through it and movable from normal position by fluid pressure to permit fluid to flow around it; means for supporting said tubular member slidably and for restricting the fluid flow through it, said means having two longitudinal grooves extending from opposite ends and terminating short of the other end and connected solely by annular grooves in said means; and a spring for resisting movement of the tubular member by fluid pressure.

5. A fluid flow control device for the outlet port of a fluid displacement chamber of a hydraulic shock absorber, comprising telescopically engaging members, one of which is adapted to be moved by fluid pressure to permit fluid to flow through the port; longitudinal ducts in the other member, one duct terminating short of one end of said member and being angularly positioned relatively to the other duct which terminates short of the other end of said member; and means in the peripheral surface of said other member providing the only connection between the two ducts.

RALPH I. BATES.